United States Patent
Koch

(10) Patent No.: US 8,100,115 B2
(45) Date of Patent: Jan. 24, 2012

(54) METHOD FOR OPERATING A SPARK IGNITION ENGINE

(75) Inventor: Thomas Koch, Böblingen (DE)

(73) Assignee: Daimler AG, Stuttgart (DE)

( * ) Notice: Subject to any disclaimer, the term of this patent is extended or adjusted under 35 U.S.C. 154(b) by 479 days.

(21) Appl. No.: 12/319,801

(22) Filed: Jan. 12, 2009

(65) Prior Publication Data

US 2009/0173319 A1   Jul. 9, 2009

Related U.S. Application Data

(63) Continuation-in-part of application No. PCT/EP2007/005804, filed on Jun. 29, 2007.

(30) Foreign Application Priority Data

Jul. 14, 2006   (DE) .................. 10 2006 032 719

(51) Int. Cl.
*F02M 25/07* (2006.01)
*F02B 47/08* (2006.01)
*F02B 33/44* (2006.01)
*F02B 75/12* (2006.01)

(52) U.S. Cl. ............... 123/568.12; 123/316; 123/568.21

(58) Field of Classification Search .... 123/90.15–90.18, 123/58.8, 316, 568.11–568.14, 568.21, 308, 123/432; 701/101–103, 108; 60/605.2
See application file for complete search history.

(56) References Cited

U.S. PATENT DOCUMENTS

| 5,682,854 | A  | * | 11/1997 | Ozawa ........................ | 123/316 |
| 5,862,790 | A  | * | 1/1999  | Dai et al. ..................... | 123/316 |
| 6,571,765 | B2 | * | 6/2003  | Kuboshima et al. ......... | 123/316 |
| 7,188,020 | B2 | * | 3/2007  | Yasui et al. ................... | 701/103 |
| 7,753,037 | B2 | * | 7/2010  | Hatamura ................ | 123/568.13 |

FOREIGN PATENT DOCUMENTS

| DE | 42 16 759    |   | 2/1993  |   |            |
| DE | 199 50 677   |   | 4/2001  |   |            |
| GB | 2 358 435    |   | 7/2001  |   |            |
| JP |   04175452   | A * | 6/1992 | ............... | 123/568.14 |
| JP | 07 156691    |   | 6/1995  |   |            |
| JP | 10 318005    |   | 12/1998 |   |            |
| JP | 103 18 005   |   | 12/1998 |   |            |
| JP | 2003129874   |   | 5/2003  |   |            |
| JP | 2006097657   |   | 4/2006  |   |            |
| JP | 2007 271464  |   | 10/2007 |   |            |
| JP | 2009-518746  |   | 8/2009  |   |            |

* cited by examiner

*Primary Examiner* — Willis Wolfe, Jr.
(74) *Attorney, Agent, or Firm* — Klaus J. Bach

(57) ABSTRACT

In a method for operating a spark ignition engine, wherein the inlet valves of the spark ignition engine are closed very early or very late, and a combustion air flow which is supplied to the spark ignition engine is compressed by means of a charger, and, under full load operation, the inlet valves are closed either early or late to avoid knocking of the engine, a partial flow of re-circulated exhaust gas is supplied to the combustion air flow supplied to the engine also during full load engine operation.

12 Claims, 1 Drawing Sheet

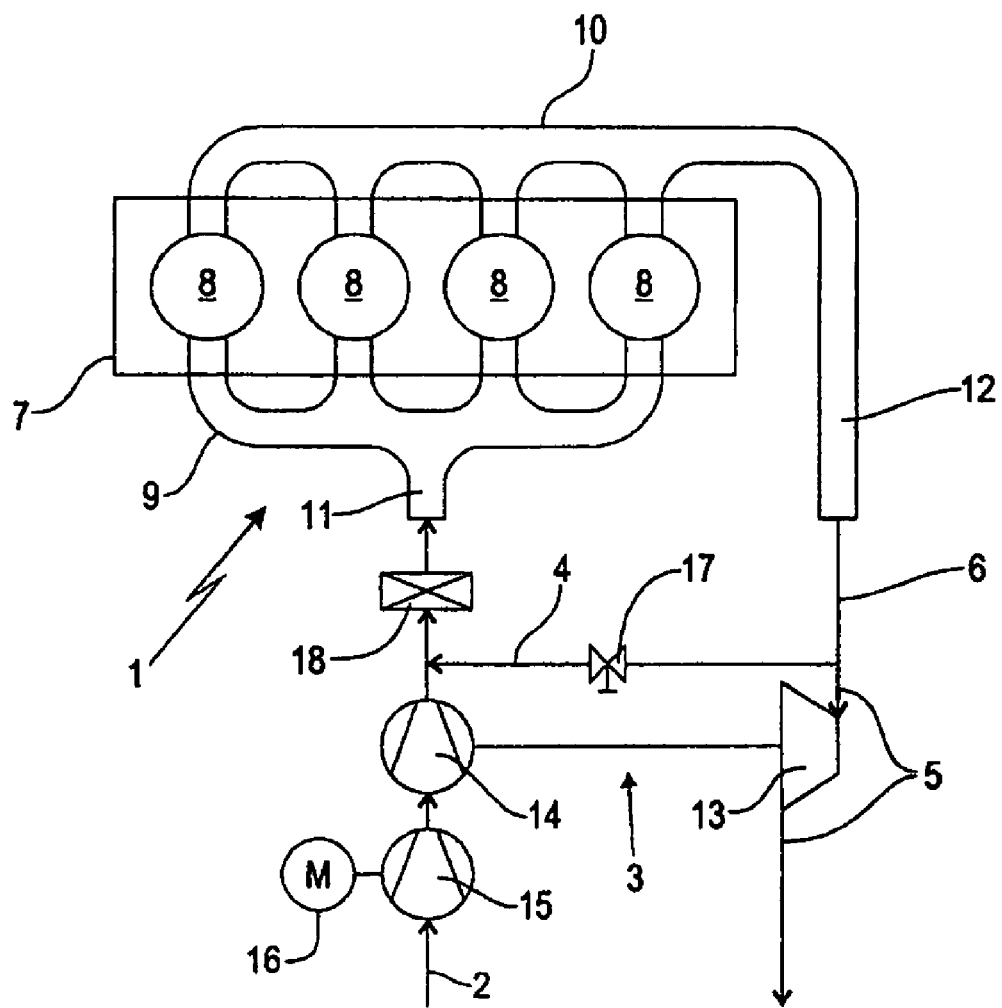

METHOD FOR OPERATING A SPARK IGNITION ENGINE

This is a Continuous-In-Part Application of pending international patent application PCT/EJP2007/005804 filed Jun. 29, 2007 and claiming the priority of German patent application 10 2006 032 719.5 filed Jul. 14, 2006.

BACKGROUND OF THE INVENTION

The invention relates to a method for operating a spark ignition engine, in particular in a utility vehicle wherein at least one inlet valve is closed very late or very early and air compressed by a charger is supplied to the engine.

Usually diesel engines are used in utility vehicles, which, depending on the design with high compression ratios providing for a comparatively high thermodynamic efficiency level have generally a good operating efficiency. However, the injection systems of the diesel engines and other components are expensive. Furthermore, their high level of pollutant emissions, in particular soot emissions in the full load operating mode, is also disadvantageous.

Spark ignition engines can be used, given a corresponding design, with an air ratio of $\lambda=1$ or higher, that is to say in a lean operating mode. The resulting exhaust gases are virtually soot-free compared to the diesel engine. However, the operating efficiency of spark ignition engines is limited by a large number of thermodynamic peripheral conditions. In view of the tendency of motor fuel to experience premature auto-ignition (knocking), the geometric compression ratio must not exceed a specific limit value and is significantly below that of a diesel engine. The thermodynamic efficiency is correspondingly limited.

In order to improve the efficiency it is known to operate a spark ignition engine according to the so-called Miller method. In this method, the spark ignition engine is given a compression ratio which is higher than in a normal spark ignition engine. In order to compensate for the resulting tendency to knock, the inlet valves of the cylinders are closed very early or very late, that is to say significantly before or significantly after the assigned bottom dead center BDC=540°. As a result, intake of fresh combustion air is either interrupted early or else part of the taken-in quantity of air is pushed back into the intake manifold. As a result, the respective cylinder is only filled incompletely. Despite the increased geometric compression, the combustion air pressure and temperature levels are therefore reduced whereby knocking can be avoided.

In a particular development of the abovementioned method as it is known for example from DE 199 50 677 A1, in the partial load range, a relatively high compression ratio is provided. By adjusting the opening time of the inlet and also of the outlet valves in the full load range, the compression pressure of the combustion gas can be kept relatively low in spite of the increased compression ratio. In addition, supercharging can be provided. A lean operating mode is optionally suggested for the low and partial load ranges. In the throttled state, that is to say in the lower load range, exhaust gas recirculation can also be performed.

A spark ignition engine which is operated in this way can be operated reliably only to a limited degree, in particular in the full load operating mode. The pistons and components which conduct exhaust gas in the region of the outlet valves are subject to high thermal loading. In order to reduce the thermal loading, enrichment of the fuel/air mixture is usually performed in the full load operating mode, which leads to disadvantages in terms of fuel consumption and increased emissions of pollutants.

In particular in view of the last-mentioned disadvantages, spark ignition engines which are operated in this way are suitable for utility vehicles only to a limited extent. Utility vehicles are operated, in comparison to passenger cars, over much larger periods, under high or even under full load. In order to still achieve a sufficiently long service life of the internal combustion engine, structural measures and/or operating parameters are to be provided which limit the thermal-mechanical loads on the various engine components. The usual thermal limiting through enrichment of the fuel/air mixture at full load leads, particularly in utility vehicles with high full load operating periods, results in inadequate operating efficiency so that the potential for low emissions of pollutants is not utilized.

It is the object of the present invention to provide a method for operating a spark ignition engine with improved operating efficiency.

SUMMARY OF THE INVENTION

In a method for operating a spark ignition engine, wherein the inlet valves of the spark ignition engine are closed very early or very late, and a combustion air flow which is supplied to the spark ignition engine is compressed by means of a charger, and, under full load operation, the inlet valves are closed either early or late to reduce the volumetric compression ratio and thereby avoid knocking of the engine, a partial flow of re-circulated exhaust gas is supplied to the combustion air flow to the engine also during full load engine operation.

The very early or very late closing of the at least one inlet valve, in particular in conjunction with a geometric compression ratio which is increased compared to the operating mode of a normal supercharged engine, causes a reduction in the temperature level accompanied by increased thermodynamic efficiency. The filling of the cylinders which is reduced by the closing times of the inlet valves is at least approximately compensated for by the compression of the combustion air flow by means of the charger, with the result that an adequate power level is available. A single-stage or multi-stage charger in the form of a turbocharger, compressor or the like, if appropriate in combination with an electric booster or the like, can be used as the charger. At least at full load, a partial flow of exhaust gas is re-circulated to the intake duct as a further measure for reducing the temperature.

The sum of the abovementioned measures permits full use of potential advantages under full load and high partial load engine operation: The temperature level is lowered to such an extent that there is no need for enriching the fuel/air mixture. According to the invention, the spark ignition engine can be operated at least at full load and in particular also at partial load with an air ratio of greater than or equal to approximately 1, and advantageously with an air ratio in a range from approximately 1 to approximately 2. By avoiding thermal-mechanical overloading, a low specific level of fuel consumption with virtually soot-free exhaust gas is obtained at full load and at partial load. The exhaust gas may be further treated by a catalytic converter of any design arranged in the exhaust duct.

In an advantageous development, the exhaust gas recirculation, at least at full load, but in particular also at partial load, is performed at a rate in the range of 10% to 35%, in particular 15% to 24% and preferably at a rate of approximately 18% of the combustion gas flow volume supplied to the engine. The cooling, the specific fuel consumption and emissions of exhaust gases are optimized.

In one expedient embodiment, the at least one inlet valve of a particular or each cylinder is closed timely before the bottom dead center (540° crank angle) which is associated with the intake stroke. The closing preferably takes place at a crank angle in a range of 80° to 60° and in particular at approximately 70° before the associated dead center. This provides for an optimum combination of the power which can be produced and the lowest fuel consumption.

In order to optimize the efficiency in different load ranges, a time for the closing of the at least one inlet valve is advantageously set in a variable fashion as a function of the operating point of the spark ignition engine.

An exemplary embodiment of the spark ignition engine which is operated according to the invention is illustrated in the accompanying drawing.

BRIEF DESCRIPTION OF THE DRAWINGS

The single FIGURE shows a schematically an engine according to the invention.

DETAILED DESCRIPTION OF A PARTICULAR EMBODIMENT OF THE INVENTION

The FIGURE shows schematically a spark ignition engine 1 in including cylinder block 7 with four cylinders 8 in which pistons which are arranged in such a way that they can move up and down are disposed.

As illustrated an intake duct 11 supplies a combustion air flow 2 including a portion of recirculated exhaust gas to the cylinders 8 via an intake manifold 9. In order to form a fuel/air mixture which is to be burnt in the cylinders 8, fuel can either be injected into the intake duct 11 (intake manifold injection) or directly into the cylinders 8 (direct injection). The supply of the combustion air flow 2 to the cylinders 8 is controlled by means of inlet valves (not illustrated), wherein each cylinder 8 has at least one inlet valve.

The exhaust gases which are produced during the combustion of the fuel/air mixture in the cylinders 8 are conducted away as exhaust gas flow 6 from the cylinders 8 via an exhaust gas manifold 10 and an exhaust line 12. The outlet control of the exhaust gas flow 6 out of the cylinders 8 is carried out by means of outlet valves (not illustrated), wherein at least one outlet valve is assigned to each cylinder 8.

The exhaust line 12 can be connected in a flow-conducting fashion to the intake line 11 via an exhaust gas recirculation line 4. A regulating valve 17 is provided in the recirculation line 4, by means of which the volume of a partial flow of exhaust gas re-circulated to the combustion air flow 2 can be metered.

A flow 5 of the exhaust gas 6, which remains after the branching off of the partial recirculation gas flow, is conducted through a turbine 13 of a charger 3, as a result of which a compressor 14 of the charger 3 is driven. The compressor 14 compresses the combustion air flow 2 before the combustion air flow 2 is fed into the cylinders 8. A pre-compressor 15 may optionally be arranged upstream of the compressor 14 as part of the charger 3, which pre-compressor 15 is driven by a separate motor 16. The pre-compressor 15 can contribute, as a so-called booster, to increasing the combustion air charge of the engine in the load operating range. The charger 3 shown is for example an exhaust gas turbocharger. Any other desired designs of a single-stage or multistage charger 3 can also be used.

The exhaust gas recirculation line 4 with the regulating valve 17 branches off upstream of the turbine 13 from the exhaust line 2, but it can also be branched off down-stream of the turbine 13. It leads into the intake line 11 downstream of the compressor 14. Accordingly, the compressor 14 and the pre-compressor 15 compress only the supplied combustion air flow 2. It may also be expedient to allow the exhaust gas recirculation line 4 to open into the intake line 11 upstream of the compressor 14 and/or of the pre-compressor 15, so that the overall gas flow is compressed by the compressor 14 and/or the pre-compressor 15.

Downstream of the point at which the exhaust gas recirculation line opens into the intake line 11, a heat exchange 18 is arranged, which cools the overall gas flow formed from the combustion air flow 2 and the partial exhaust gas flow though the recirculation line 4, and therefore lowers the operating temperature in the cylinders 8. At the same time, the specific gas density is raised. It may also be expedient to arrange a heat exchanger 18 in the intake duct 11, or to provide a heat exchanger 18 solely for cooling the compressed combustion air flow 2 and the partial exhaust gas recirculation flow of the exhaust gas flow 6.

In the method according to the invention for operating the spark ignition engine 1 shown, the geometric compression ratio, that is to say the ratio of the volume in the cylinders 8 at the bottom dead center to the volume at the top dead center, is at least approximately 10. The spark ignition engine 1 is provided for operation in a utility vehicle. A comparable spark ignition engine has, when configured for the supercharged normal operating mode, that is to say with the use of the compressor 14 and/or the pre-compressor 15 but without the inventive inlet control and exhaust gas recirculation, a geometric compression of ratio of 7.5. By comparison, the geometric compression ratio is therefore, for example, increased by 2.5 units to 10. The compression ratio is advantageously increased by 1 to 6 units, preferably by 2 to 4 units, compared to a reference engine. This corresponds to a range of the geometric compression ratio from 8.5 to 13.5 or from 9.5 to 11.5.

Relatively small spark ignition engines, in particular in passenger cars, can also have a relatively high reference compression in the supercharged normal operating mode. The reference compression should be increased in a corresponding way for the operating method according to the invention. Compression ratios up to 23 are possible.

The inlet valves of the cylinders 8 are closed either very early or very late, that is to say significantly before or after the respectively assigned bottom dead center position at a crank angle of 540°. The inlet valves are preferably closed temporally before the bottom dead center, which is also referred to as "early inlet closing". The time for the closing of the inlet valves is variable as a function of the operating point of the spark ignition engine 1 and, in particular, as a function of the load demand. Preferred times for the closing of the inlet valves are at a crank angle in a range from 80° to 60°, and in particular at approximately 70° before the assigned bottom dead center at a crank angle of 540°. This corresponds to a crank angle for the closing of the valve in a range from 460° to 480°, and in particular at approximately 470°. A remaining valve stroke of approximately 1 mm is assumed as a measure of the closed state of the valve.

The exhaust gas recirculation by combining the partial flow 4 of the exhaust gas flow 6 with the combustion air flow 2, is carried out at full load and also at partial load. Exhaust gas recirculation can also be expedient for the low load range. The exhaust gas recirculation rate at full load and also at partial load is in a range of 10% to 35% of the overall gas flow supplied to the cylinder 8. Said exhaust gas recirculation rate is in particular in a range from 15% to 24%, and is approximately 18% in the exemplary embodiment shown.

With the combustion air flow 2 through the intake duct, the partial exhaust gas recirculation flow through the exhaust gas recirculation line 4 and the injected quantity of fuel are matched to one another in such a way that at full load and in particular also at partial load the spark ignition engine is operated with an air/fuel ratio of approximately 1 or above, that is to say stoichiometrically or in lean mode. A preferred range of the air ratio extends from approximately 1 to approximately 2. The upper limit is determined by the limit of engine misfire.

With the sum of the abovementioned measures the spark ignition engine 1 can be continuously operated in the full load range and the upper partial load range without thermal-mechanical overload phenomena occurring. Compared to conventional methods, a specific saving in fuel of more than 10% is obtained. Compared to a diesel engine, significant emission advantages, in particular in terms of the emission of soot, are obtained. It is, furthermore, not necessary to lower the temperature of the exhaust gas by enriching the fuel/air mixture. Exhaust gas post-treatment can additionally be performed by a catalytic converter in the exhaust gas line 12. The spark ignition engine 1 which is operated according to the inventive method is particularly suitable for use in utility vehicles, but it can also be used in passenger cars.

What is claimed is:

1. A method for operating a supercharged spark ignition engine (1) including an intake duct (11) with a charger (14) and at least one intake valve for controlling the flow (2) of combustion air to the spark ignition engine (1), and an exhaust duct (12) for discharging exhaust gas from the spark ignition engine (1), the engine having a geometric compression ratio of at least 10, said method comprising the steps of: closing during full load engine operation the at least one intake valve of the spark ignition engine (1) very early or very late so as to reduce the volumetric compression ratio during full load engine operation, and re-circulating exhaust gas from the exhaust duct (12) to the combustion air flow (2) the closing time of the at least one intake valve being controlled as a function of the engine operating point and the load demand.

2. The method as claimed in claim 1, wherein the exhaust gas recirculation also takes place at partial load.

3. The method as claimed in claim 1, wherein the at least one inlet valve is closed before the bottom dead center.

4. The method as claimed in claim 1, wherein exhaust gas is re-circulated at a rate in the range of 10% to 35% of the combustion gas supplied to the engine.

5. The method as claimed in claim 4, wherein the exhaust gas recirculation rate is between 15 and 24% and preferably of approximately 18%.

6. The method as claimed in one of claims 1, wherein the spark ignition engine (1) is operated with an air ratio of at least approximately 1 at full load and also at partial load.

7. The method as claimed in claim 6, wherein the spark ignition engine (1) is operated with an air ratio in a range from 1 to 2.

8. The method as claimed in one of claims 1, wherein the spark ignition engine (1) is operated with a geometric compression ratio which is higher than that of an engine with supercharged normal operating mode by 1 to 6 units.

9. The method as claimed in claim 8, wherein the at least one inlet valve is closed at a crank angle in a range of 80° to inclusively 60° before the bottom dead center.

10. The method as claimed in claim 9, wherein at least one inlet valve is closed at a crank angle of about 70° before the bottom dead center position of the crankshaft.

11. The method as claimed in claim 9, wherein a time for the closing of the at least one inlet valve is set in a variable fashion as a function of the operating point of the spark ignition engine (1).

12. The method as claimed in claim 11, wherein at least one of the combustion air flow (2) and the recirculation flow (4) is cooled.

\* \* \* \* \*